US010330459B1

(12) United States Patent
Matthews et al.

(10) Patent No.: US 10,330,459 B1
(45) Date of Patent: Jun. 25, 2019

(54) LIGHT PULSE ATOM INTERFEROMETER VELOCITY REFERENCE

(71) Applicant: AOSense, Inc., Sunnyvale, CA (US)

(72) Inventors: Michael R. Matthews, Palo Alto, CA (US); Adam T. Black, Annandale, VA (US); Mark A. Kasevich, Palo Alto, CA (US); Micah Ledbetter, Sunnyvale, CA (US)

(73) Assignee: AOSense, Inc., Sunnyvale, CA (US)

( * ) Notice: Subject to any disclaimer, the term of this patent is extended or adjusted under 35 U.S.C. 154(b) by 29 days.

(21) Appl. No.: 15/447,042

(22) Filed: Mar. 1, 2017

(51) Int. Cl.
*G01B 9/02* (2006.01)
*G01V 7/04* (2006.01)
*G01P 15/093* (2006.01)

(52) U.S. Cl.
CPC ..... *G01B 9/02024* (2013.01); *G01B 9/02002* (2013.01); *G01B 9/02011* (2013.01); *G01B 9/02012* (2013.01); *G01P 15/093* (2013.01); *G01V 7/04* (2013.01)

(58) Field of Classification Search
CPC ............ G01B 9/02024; G01B 9/02002; G01B 9/02011; G01B 9/02012; G01P 15/093; G01V 7/04; G21K 1/006
USPC .......................................... 356/450; 250/251
See application file for complete search history.

(56) References Cited

U.S. PATENT DOCUMENTS

| 3,761,721 | A | 9/1973 | Altshuler |
| 4,874,942 | A | 10/1989 | Clauser |
| 5,274,232 | A | 12/1993 | Chu |
| 6,635,867 | B2 | 10/2003 | Kajita |

OTHER PUBLICATIONS

Andersen et al ( Lattice Interferometer for Laser-Cooked Atoms, PRL 103, 070402 (2009)).*
Dalibard et al., Laser Cooling Below the Doppler Limit by Polarization Gradients: Simple Theoretical Models, Journal of the Optical Society of America B, Nov. 1989, 2023-2045, vol. 6, No. 11.
Kerman et al., Beyond Optical Molasses: 3D Raman Sideband Cooling of Atomic Cesium to High Phase-Space Density, Physical Review Letters, Jan. 17, 2000, 439-442, vol. 84, No. 3.
Peters et al., High-Precision Gravity Measurements Using Atom Interferometry, Metrologia, 2001, 25-61, vol. 38.
Inguscio et al., Atomic Physics: Precise Measurements and Ultracold Matter, Original Publication Date 2013, Reprinted with Corrections 2015, Oxford University Press, Oxford, United Kingdom Entire book submitted.
Metcalf et al., Laser Cooling and Trapping, 1999, Springer-Verlag New York, Inc. Entire book submitted.

* cited by examiner

*Primary Examiner* — Tarifur R Chowdhury
*Assistant Examiner* — Jonathon Cook
(74) *Attorney, Agent, or Firm* — Van Pelt, Yi & James LLP

(57) ABSTRACT

A light pulse interferometer includes a first atom source and a first laser. The first atom source is configured to direct a first group of atoms in a first direction. The first laser is configured to generate one or more interferometer laser beam pairs. The one or more interferometer laser beam pairs interact with the first group of atoms in an interferometer sequence of three or more pulses to produce atom interference. A first laser beam pair of the one or more interferometer laser beam pairs is disposed to interact with the first group of atoms to perform 1D-cooling and velocity control of the first group of atoms prior to the interferometer sequence.

22 Claims, 10 Drawing Sheets

LIGHT PULSE ATOM INTERFEROMETER VELOCITY REFERENCE

This invention was made with Government support under Contract #HR0011-09-C-0116 awarded by DARPA. The Government has certain rights in the invention.

BACKGROUND OF THE INVENTION

Light-pulse atom interferometers (LPAI) comprise an evacuated enclosure in which atoms with suitable electronic structure such as alkali atoms can be manipulated using one or more laser beams. Pulsed or continuous atom sources may be used. In a pulsed atom source LPAI, atoms are first collected and cooled using optical and magnetic forces. The atoms are then dropped or launched, typically using the same laser beams that provided cooling. Often the same laser beams then produce the desired internal state of the atoms. The atoms then travel and enter the interferometer region. For the continuous atom source case, atomic beams based on collimated vapor from an oven or 2D-magneto-optic traps may also be used as atom sources, with or without transverse laser cooling. In the continuous atom source case, the transit of the atoms through continuous-wave laser beams defines effective interferometer light pulses. The interferometer region comprises one or more interferometer laser beams such as two-photon stimulated Raman transition beams or multi-photon Bragg beams that are used to create and manipulate a superposition of different internal and/or external atomic states. The interferometer can be configured for sensitivity to accelerations, rotations, laser frequency, or electric and magnetic fields. Finally, the state of the atoms is detected; for example, the probability of an atom being in a particular internal state may be determined by measuring fluorescence of atoms in one or more detection laser beams tuned to appropriate atomic transitions. Three or more interactions with the interferometer beams are required to create the atom interferometer. In many atom interferometers, the velocity of the atoms is not well referenced to the interferometer laser beams and it can change over time due to temperature or mechanical drifts of the sensor. In addition, the velocity of multiple, separated collections of atoms are not well referenced to each other. Because of these uncontrolled velocities, undesired changes in the locations of laser beams or acceleration of the entire sensor may lead to problems of noise, inaccurate measurements or a reduction in signal size.

BRIEF DESCRIPTION OF THE DRAWINGS

Various embodiments of the invention are disclosed in the following detailed description and the accompanying drawings.

DETAILED DESCRIPTION

Figure 1:
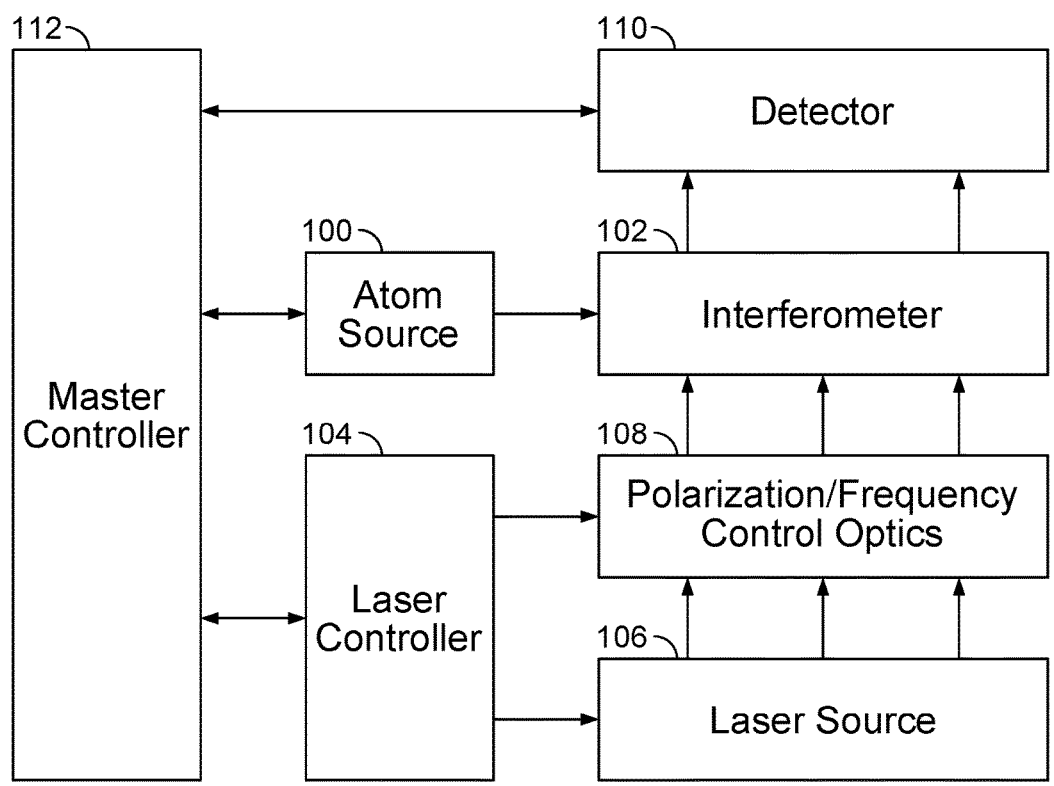
FIG. 1 is a block diagram illustrating an embodiment of a light pulse interferometer.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A light pulse interferometer is disclosed. The light pulse interferometer comprises a first atom source and a first laser. The first atom source is configured to direct a first group of atoms in a first direction. The one or more interferometer laser beam pairs interact with the first group of atoms three or more times in an interferometer sequence to produce atom interference. The first laser beam pair of the one or more interferometer laser beam pairs is disposed to interact with the first group of atoms to perform 1D-cooling and velocity control of the first group of atoms prior to the interferometer sequence. In some embodiments, a second atom source is configured to direct a second group of atoms with a second velocity distribution in a second direction. A second laser beam pair of the one or more interferometer laser beam pairs interacts with the second group of atoms to perform 1D-cooling and velocity control of the second group of atoms prior to the second interferometer sequence. In some embodiments, the first laser is configured to generate one or more interferometer laser beam pairs that may be pulsed in the case of atoms launched from a trap or may be continuous in the case of a continuous atom source.

In some embodiments, a light pulse interferometer comprises an atom source such as a magneto-optic trap or atomic beam to launch or otherwise direct a group of atoms in a first direction, and the first laser beam pair that the atoms encounter of the one or more interferometer beam pairs is used to prepare the atoms by performing 1D-cooling of the group of atoms before the interferometer sequence begins. The cooling light reduces velocity components projected along the axis of the cooling light. In the case of atom velocities approximately perpendicular to the cooling beams, this makes the atom velocity more nearly perpendicular to the cooling axis. Since one of the interferometer laser beam pairs is used to produce the cooling light, the 1D-cooling makes the atom velocity more nearly perpendicular to the interferometer beam pairs. In the context of this description, the phrase 1D-cooling is used to describe the one-dimensional cooling process used to make the mean atomic velocity more nearly perpendicular to the axis of the cooling light. Reduction of the transverse velocity spread through the 1D-cooling process is also beneficial, but is not essential. Three or more interferometer laser beam pulses are used to divide and recombine atomic wavepackets, forming an atom interferometer that can be used to measure inertial acceleration or rotation. This approach may be used in the case of interferometer beams that are perpendicular to the atom velocity. It may also be used with a vertically launched or dropped cloud of atoms from a magneto-optic trap or magneto-optical molasses, in which case a single laser beam pair pulsed at appropriate times may be used for 1D-cooling and interferometer functions, as well as for state preparation and detection if desired.

In many atom interferometers, the velocity of the atoms is not well referenced to the interferometer laser beams and it can change over time due to temperature or mechanical drifts of the sensor. In addition, the velocity of multiple, separated collections of atoms are not well referenced to each other. Because of these uncontrolled velocities, undesired changes in the locations of laser beams or acceleration of the entire sensor may lead to problems of noise, inaccurate measurements or a reduction in signal size. In some embodiments, the light pulse atom interferometer velocity reference uses the leading edge of the first interferometer beam pair that the atoms travelling a particular direction encounter to further cool the atoms into a preferred velocity frame as defined by the orientation of the interferometer beam. The cooling process reduces velocity components along the cooling beam. In some embodiments, the first laser beam pair is additionally used to perform state preparation of the atoms to ensure that atoms are in the desired internal quantum state.

FIG. 1 is a block diagram illustrating an embodiment of a light pulse interferometer. In some embodiments, the light pulse interferometer of FIG. 1 comprises a light pulse interferometer for performing an atomic interferometric measurement. In some embodiments, the light pulse interferometer of FIG. 1 comprises a light pulse interferometer for measuring gravity, acceleration, rotation, or any other appropriate property. In the example shown, the light pulse interferometer of FIG. 1 comprises atom source 100. In some embodiments, atom source 100 comprises an atomic vapor source (e.g., for supplying atoms). In some embodiments, atom source 100 comprises an atomic trap used to collect and cool atoms. In some embodiments, atom source 100 is able to launch cooled atoms (e.g., by imparting a velocity in a specific direction). In the example shown, atom source 100 launches cooled atoms into interferometer 102. In some embodiments, a series of interferometer pulses are performed to enable a measurement by interacting with atoms as they pass through interferometer 102. In the example shown, laser controller 104 provides control information to laser source 106 and polarization/frequency control optics 108 to provide controlled laser light to interferometer 102. In some embodiments, laser controller 104, laser source 106, and polarization/frequency control optics 108 comprise a laser cooling beam referenced to the interferometer. Detector 110 detects fluorescence from atoms interrogated by resonant laser light leaving interferometer 102. In some embodiments, laser light is emitted by laser source 106, is controlled by polarization/frequency control optics 108, interacts with atoms in interferometer 102, and is received by detector 110. Master controller 112 comprises a master controller for providing control information to and/or receiving measurement data from cooled atom source 100, laser controller 104, and detector 110.

Figure 2:
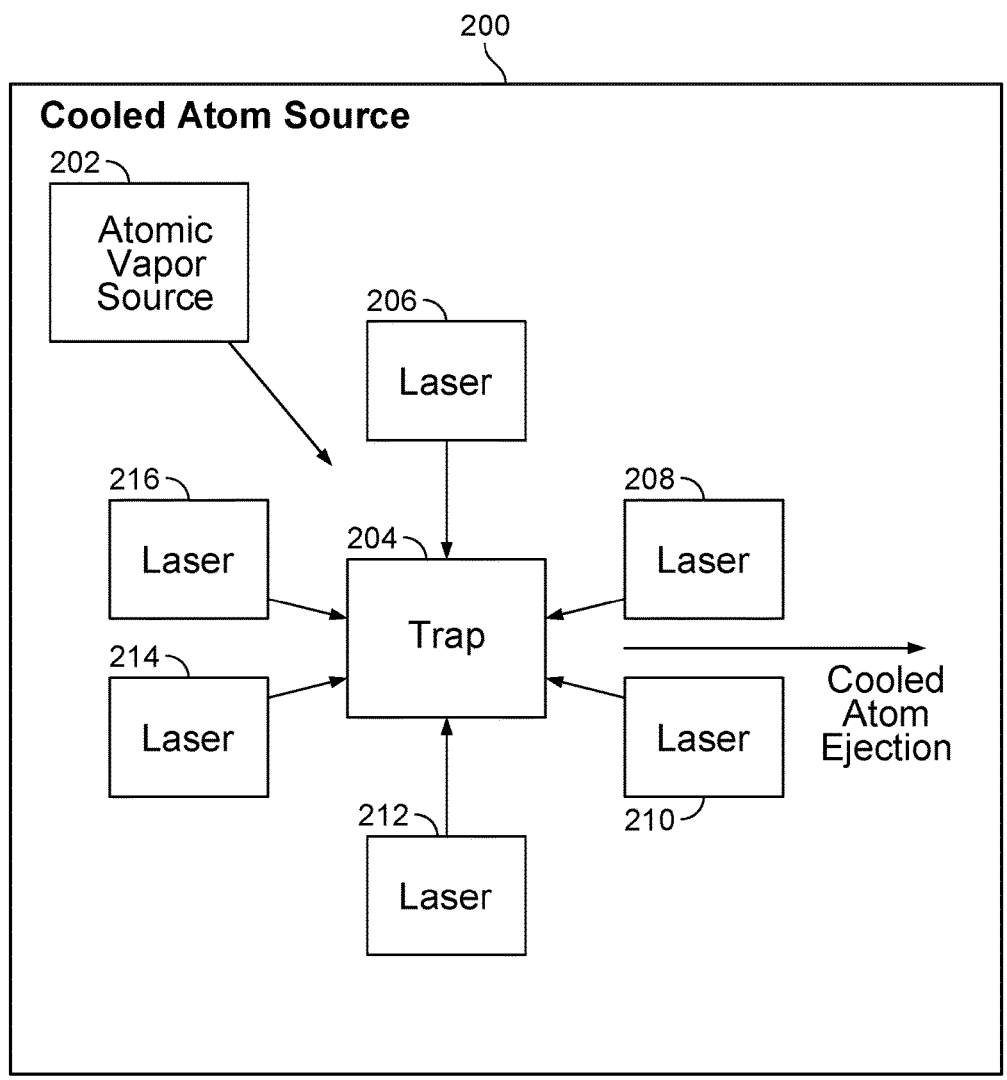
FIG. 2 is a block diagram illustrating an embodiment of a cooled atom source.

FIG. 2 is a block diagram illustrating an embodiment of a cooled atom source. In some embodiments, cooled atom source 200 comprises atom source 100 of FIG. 1. In the example shown, cooled atom source 200 comprises atomic vapor source 202. In various embodiments, atomic vapor source 202 provides a directed source of atoms such as an atomic beam or comprises a two-dimensional magneto-optic trap (2D-MOT) for loading trap 204. In some embodiments, atomic vapor source 202 provides an undirected source of atoms for loading trap 204, such as a dispenser that releases atoms when heated (e.g., via a current), or a purified source of atoms in their elemental form. In various embodiments, atomic vapor source 202 provides sodium atoms, rubidium atoms, cesium atoms, or any other appropriate atoms. Optical and magnetic forces are used to cool atoms from atomic vapor source 202 and guide them toward the magnetic field zero of trap 204. In the example shown, laser 206, laser 208, laser 210, laser 212, laser 214, and laser 216 provide optical forces for cooling. In the example shown, laser 206, laser 208, laser 210, laser 212, laser 214, and laser 216 are arranged in three orthogonal pairs. Laser 206, laser 208, laser 210, laser 212, laser 214, and laser 216 are generated using one or more laser sources (e.g., in various embodiments, laser 206, laser 208, laser 210, laser 212, laser 214, and laser 216 are generated using one laser source, using two laser sources, using 3 laser sources, or using any other appropriate number of laser sources). In some embodiments, cooled atom source 200 comprises one or more magnets to provide magnetic forces for cooling. In various embodiments, cooled atom source 200 comprises 1, 2, 3, 6, 8, 9, 24, or any other appropriate number of magnets. In various embodiments, magnets comprise rectangular magnets, cylindrical magnets, trapezoidal magnets, or magnets of any other appropriate shape. In some embodiments, the magnets comprise one or more permanent magnets. In some embodiments, the magnets comprise one or more electromagnets. In some embodiments, control information is provided to the set of lasers. In some embodiments, a specific set of control information provided to the set of lasers causes the lasers to provide optical forces for cooling (e.g., to collect atoms in trap 204). In some embodiments, different control information causes the lasers to provide optical forces affecting atoms in different ways. In some embodiments, cooled atom source 200 is able to launch a cloud of cooled atoms in a particular direction by providing appropriate control information to the set of lasers. In the example shown, cooled atoms are launched (e.g., ejected) from the trap towards the right side of the page. In some embodiments, atoms are released without being launched to fall under the influence of gravity. In some embodiments, cooled atoms launched from the trap enter an interferometer.

Figure 3A:
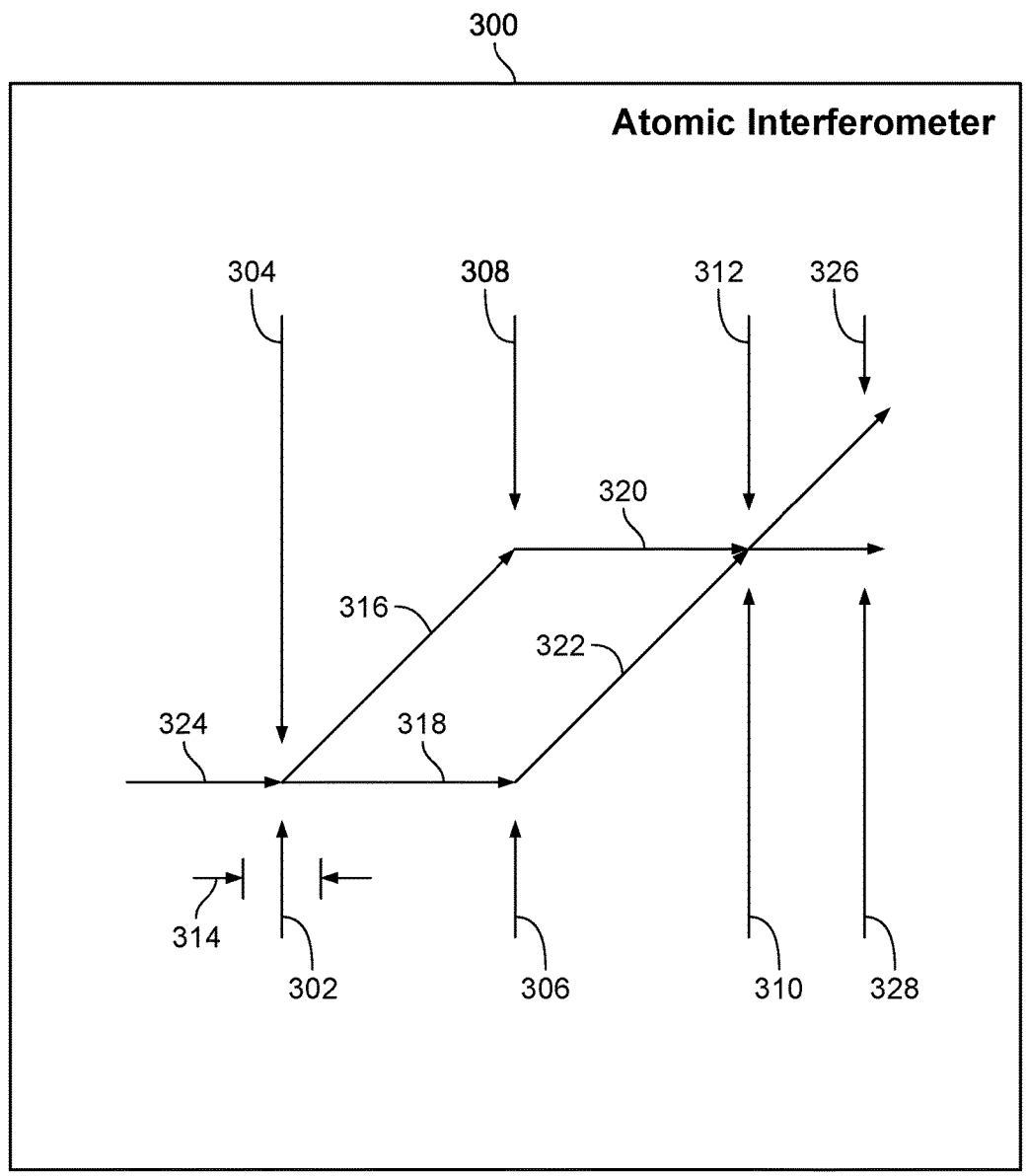
FIG. 3A is a diagram illustrating an embodiment of atomic travel through an atomic interferometer.

FIG. 3A is a diagram illustrating an embodiment of atomic travel through an atomic interferometer. In some embodiments, atomic interferometer 300 comprises interferometer 102 of FIG. 1. In some embodiments, the interferometer configuration of FIG. 3A comprises an interferometer configuration for performing a measurement. In some embodiments, the measurement utilizes two-photon Raman interferometer beams. In some embodiments, the measurement utilizes Bragg interferometer beams. In the example shown, ejected atoms 324 enter atomic interferometer 300 from the left side of the page. In some embodiments, ejected atoms are launched or directed from a trap into atomic interferometer 300. In the example shown, as ejected atoms 324 travel from the left side of the page to the right side of the page, they are exposed to three interferometer laser interaction regions. First the atoms are exposed to laser beam 302 and laser beam 304, then to laser beam 306 and laser beam 308, and finally to laser beam 310 and laser beam 312. In various embodiments, laser beam 304 and laser beam 302 comprise a single laser beam or are derived from a single laser beam. In some embodiments, laser beam 306 and laser beam 308 comprise a single laser beam or are derived from a single laser beam. In some embodiments, laser beam 310 and laser beam 312 comprise a single laser beam or are derived from a single laser beam. The energy imparted on the ejected atoms 324 by laser beam 302 and laser beam 304 cause the path of the atoms to become a superposition of two paths, upper path 316 and lower path 318. Upon exposure to laser beams 308 and 306, upward path 316 is bent downward to form path 320 and lower path 318 is bent upward to form path 322. Atoms following path 320 and atoms following path 322 meet and interact at the point of exposure to laser beam 310 and laser beam 312. In some embodiments, the atomic state of atoms leaving the interferometer is dependent on the difference in the way external forces (e.g., acceleration) affect atoms on the two paths (e.g., path 316 and path 320 as compared with path 318 and path 322). In some embodiments, the internal state of the atoms is measured by fluorescent detection via laser beam 326 and laser beam 328. In various embodiments, detection uses different beams from laser beam 302, laser beam 304, laser beam 306, laser beam 308, laser beam 310, and/or laser beam 312. In some embodiments, the laser beams of FIG. 3 comprise a laser beam width (e.g., a width within which laser power is measured to be above a threshold). In the example shown, the width of laser beam 302 is shown by spread 314. In some embodiments, the intensity profile of a laser beam comprises a Gaussian profile. In some embodiments, the intensity profile of a laser beam is engineered to comprise a flattop profile. In some embodiments, the laser beams of FIG. 3A are all produced by a single laser source. In some embodiments, the laser beams of FIG. 3A comprise laser beams for performing a measurement.

Figure 3B:
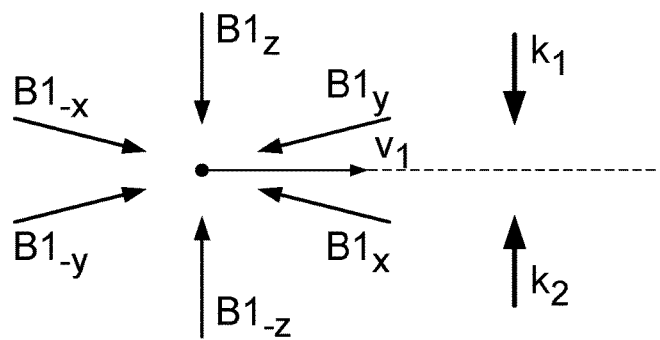
FIG. 3B is a diagram illustrating an embodiment of a geometry for cooling and launching/dropping a collection of atoms of an atomic interferometer.

FIG. 3B is a diagram illustrating an embodiment of a geometry for cooling and launching/dropping a collection of atoms of an atomic interferometer. In the example shown, laser beams are used to collect, cool, and launch or drop a collection of atoms. Pairs of oppositely propagating laser beams (e.g., the pairs shown are orthogonal along the x, y, and z axes: $B1_x$, $B1_{-x}$, $B1_y$, $B1_{-y}$, $B1_z$, and $B1_{-z}$) all propagate towards to a central location where the atoms are collected and cooled. Atoms are launched or dropped from the central location at velocity $v_1$. After launching or dropping, the atoms pass between a set of beams that are approximately perpendicular to the atom launch or drop direction (e.g., a first set of Raman/interferometer beams $k_1$ and $k_2$).

Figure 3C:
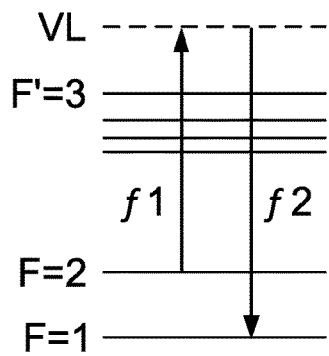
FIG. 3C is a diagram illustrating an embodiment of energy levels used for an atomic interferometer.

FIG. 3C is a diagram illustrating an embodiment of energy levels used for an atomic interferometer. In the example shown, energy levels of $^{87}Rb$ and the frequencies of the two Raman beams used for the interferometer are depicted. F=1 and F=2 are the hyperfine ground states. F'=3 is the excited state and the levels below it are F'=2, 1, 0. The virtual level VL shows the detuning of the laser beams with frequencies f1 and f2.

Figure 3D:
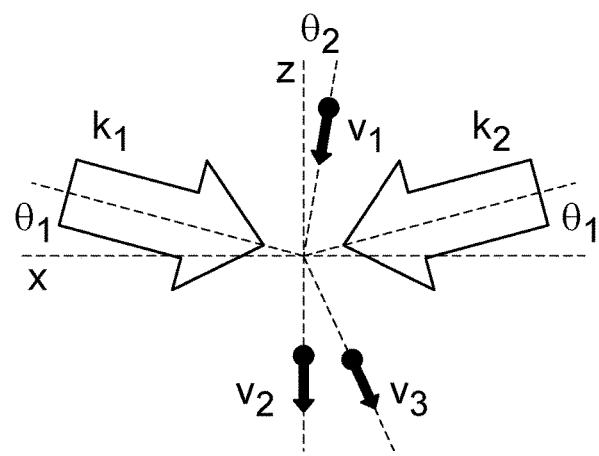
FIG. 3D is a diagram illustrating an embodiment of laser beams and atoms of an atomic interferometer.

FIG. 3D is a diagram illustrating an embodiment of laser beams and atoms of an atomic interferometer. In the example shown, an arrangement of laser beams and atoms is depicted. Laser beams propagate in the directions $k_1$ and $k_2$, which may have an angle $\pi-2\theta_1$ radians between them. In this arrangement, the laser beams have the same frequency. Atoms enter from the top with velocity $v_1$ and at angle $\theta_2$ which has components in both the x and z directions. The atoms intersect the laser beams at the origin. Interaction with the laser beams causes the output velocity to be $v_2$ where the x component is zero. Further interaction with the laser beams causes a coherent superposition of atoms having velocities $v_2$ and $v_3$.

Figure 4A:
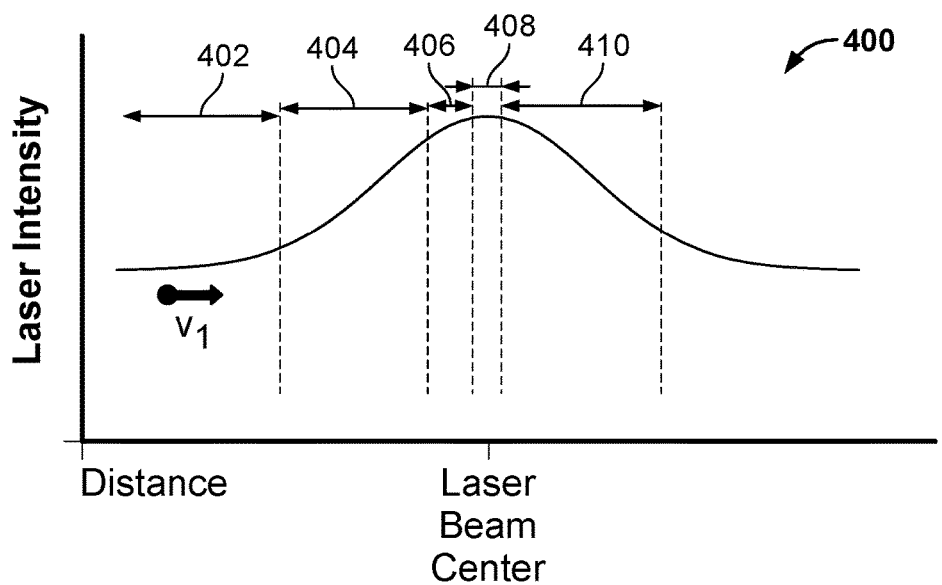
FIG. 4A is a diagram illustrating an embodiment of a laser beam profile.

FIG. 4A is a diagram illustrating an embodiment of a laser beam profile. In some embodiments, laser beam profile 400 comprises a profile of laser beam 302 of FIG. 3A. In the example shown, laser beam profile 400 comprises a spatial laser intensity profile (e.g., the laser intensity is highest in the center of the beam and drops off towards the right and towards the left). In some embodiments, laser beam profile 400 comprises a Gaussian profile. In some embodiments, atoms launched into an interferometer pass through a first laser beam or a pair of first laser beams comprising laser beam profile 400. In some embodiments, atoms launched into an interferometer pass through a laser beam comprising laser beam profile 400 moving from left to right. In the example shown, atoms passing through a laser beam comprising laser beam profile 400 pass first through region 402, then through region 404, through region 406, through region 408, and finally through region 410. In the example shown, low power region 402 comprises the laser beam leading edge (e.g., the region wherein the laser beam power is increasing up to a threshold power). While atoms are within low power region 402, the laser beam power is too low to affect the atoms in a useful way, and the laser beam is not yet used. In the example shown, velocity correction region 404 comprises a wide region where the laser beam has moderate power (e.g., from where the laser is approximately 10% of its maximum value to where the laser is approximately 80% of its maximum value). While atoms are within velocity correction region 404, velocity correction can be performed. In some embodiments, velocity correction comprises cooling. In some embodiments, velocity correction comprises cooling in the axis parallel to the laser beam (e.g., perpendicular to the nominal direction of travel of the atoms). In some embodiments, velocity correction comprises correcting the velocity to be perpendicular to the laser beam (e.g., by eliminating any component of the velocity parallel to the laser beam). Within the velocity correction region, the laser beam parameters (e.g., the intensity, polarization and frequency) are configured to provide a velocity correction to the atoms passing through the region. In some embodiments, the laser beam comprises a polarization for cooling when cooling the atoms. In some embodiments, the laser beam comprises a frequency for cooling when cooling the atoms. In some embodiments, the laser beam parameters are configured to provide a velocity correction by a laser controller and by polarization and frequency control optics. In the example shown, state preparation region 406 comprises a narrow region just prior to the peak of the laser beam power (e.g., from where the laser is approximately 80% of its maximum value to where the laser is approximately 95% of its maximum value). Within the state preparation region, the laser beam parameters are configured to prepare the quantum state of the atoms passing through the region for an interferometric measurement. In some embodiments, the laser beam comprises a polarization for state preparation when preparing the state of the group of atoms. In some embodiments, the laser beam comprises a frequency for state preparation when preparing the state of the group of atoms. In some embodiments, the laser beam parameters are configured to prepare the atomic quantum states by a laser controller polarization and frequency control optics. Interferometer region 408 at the peak of the laser beam power (e.g., from where the laser is approximately 95% of its maximum value as it is increasing, past the laser beam peak, to where the laser is approximately 95% of its maximum value as it is decreasing) comprises the region of the laser profile used for the interferometer pulse (e.g., by imparting energy into the atoms to create a superposition of atomic states). In some embodiments, the laser beam region 408 interacting with the group of atoms comprises a polarization appropriate for the desired interferometer transitions. In some embodiments, the laser beam region 408 interacting with the group of atoms comprises a frequency appropriate for the desired interferometer transitions. Region 410 comprises the remainder of the laser beam profile, which is not used. In some embodiments, transitions in the control signals to change the laser beam parameters between velocity correction, state preparation, and superposition are timed based on the velocity of the atoms as they pass through the laser beam. In some embodiments, a typical atom cloud size is similar in size to region 408, since the intensity needs to be fairly constant over the atom cloud.

Figure 4B:
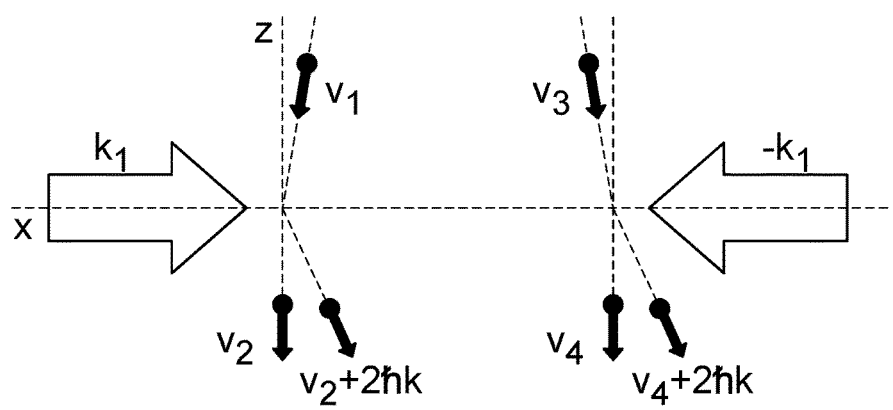
FIG. 4B is a diagram illustrating an embodiment of an atomic interferometer.

FIG. 4B is a diagram illustrating an embodiment of an atomic interferometer. In the example shown, the laser beams are nominally anti-parallel (e.g., designated $k_1$ and $-k_1$). One or more collections of atoms enter the beams at different locations and with different velocities $v_1$ and $v_3$. The laser beams turn on when the atoms are in a first region (e.g., region 404 of FIG. 4A) to cool both collections such that both velocities are perpendicular to the laser beams and $v_2$ and $v_4$ are in the same direction. The laser beams perform the same procedure as described shown in FIG. 4A in regions 406 and region 408. Further interaction with the laser beams causes a coherent superposition of atom velocities between $v_2$ and $v_2+2\hbar k$ for the atoms with initial velocity $v_1$ and between $v_4$ and $v_4 30\ 2\hbar k$ for atoms with initial velocity $v_3$.

Figure 4C:
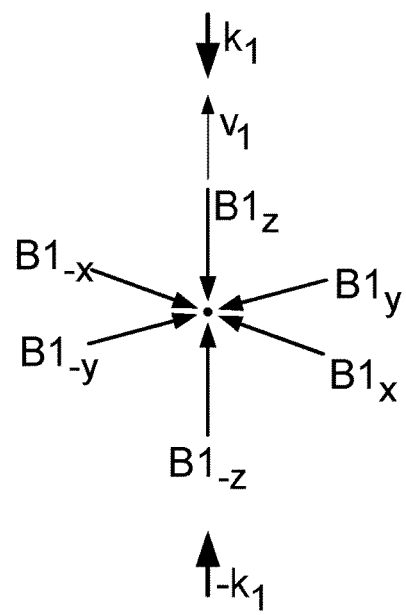
FIG. 4C is a diagram illustrating an embodiment of atoms launched or dropped from an atom source with vertical interferometer beams.

FIG. 4C is a diagram illustrating an embodiment of a geometry for cooling and launching/dropping a collection of atoms of an atomic interferometer. In the example shown, laser beams are used to collect, cool, and launch or drop a collection of atoms. Pairs of oppositely propagating laser beams (e.g., the pairs shown are orthogonal along the x, y, and z axes: $B1_x$, $B1_{-x}$, $B1_y$, $B1_{-y}$, $B1_z$, and $B1_{-z}$) all propagate towards to a central location where the atoms are collected and cooled. Atoms are launched or dropped from the central location at velocity $v_1$. The atoms are launched parallel to a set of beams (e.g., a set of Raman/interferometer beams $k_1$ and $-k_1$).

Figure 4D:
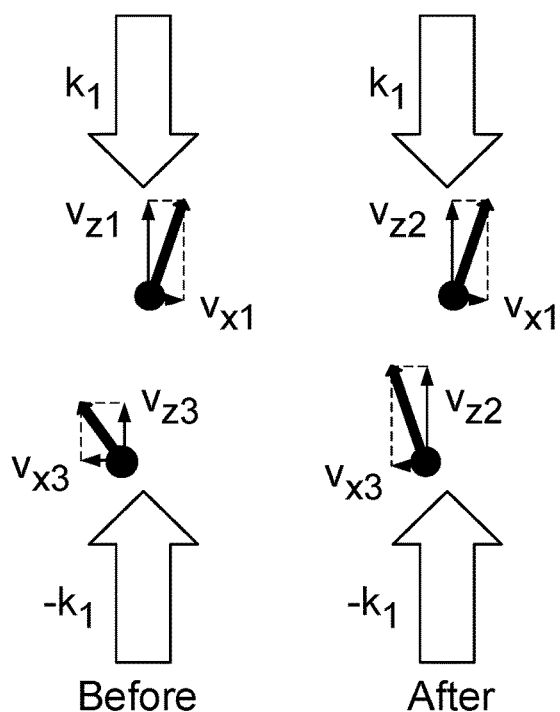
FIG. 4D is a diagram illustrating an embodiment of an atomic interferometer.

FIG. 4D is a diagram illustrating an embodiment of an atomic interferometer. In the example shown, atom velocities are nominally along the laser beams (e.g., a set of Raman/interferometer beams $k_1$ and $-k_1$). Before the cooling beams are turned on, the atoms have velocities $v_{x1}+v_{y1}+v_{z1}$ and $v_{x3}+v_{y3}+\pm v_{z3}$. The intensity and frequency of the beams are changed to cool the atoms such that the velocities after are $v_{x1}+v_{y1}+v_{z2}$ and $v_{x3}+v_{y3}+v_{z2}$ such that $v_{z2}$ is determined by the laser beams. In this arrangement, one of the laser beams can be created by retro-reflecting the other beam using a mirror.

Figure 4E:
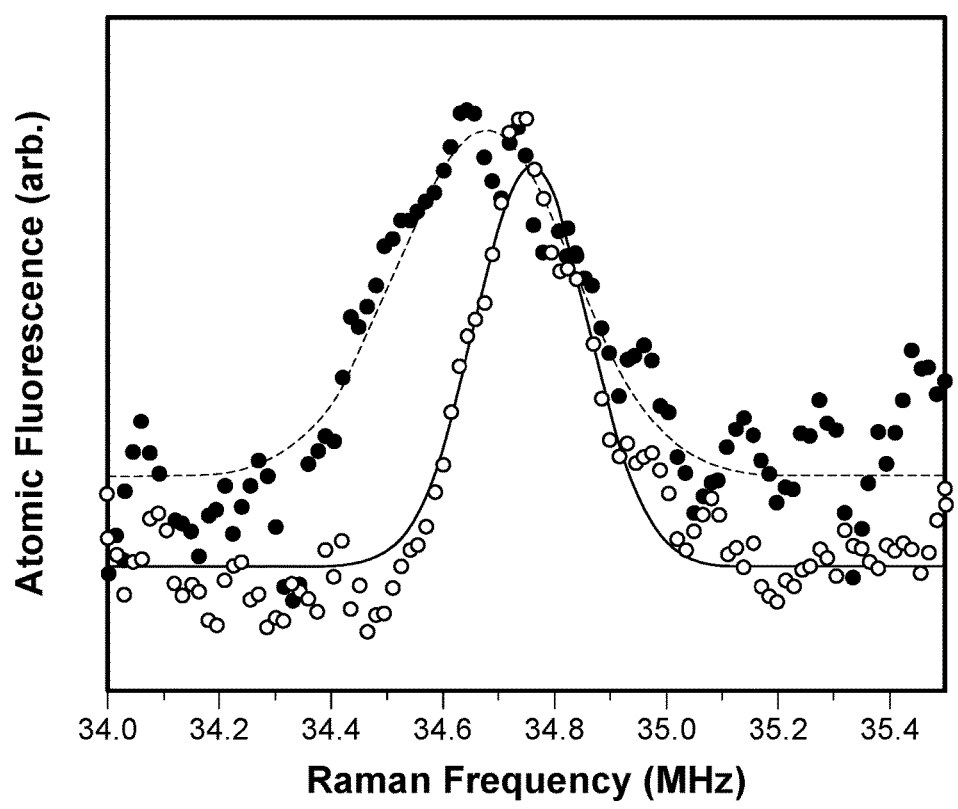
FIG. 4E is a graph illustrating an embodiment showing cooling into the reference frame of the interferometer beams.

FIG. 4E is a graph illustrating an embodiment showing cooling into the reference frame of the Raman beams. In the example shown, the vertical axis is proportional to the number of atoms in an F=2 level, which were originally prepared in the F=1 state. The horizontal axis is related to the frequency of one Raman beam (e.g., f2 in 3C). Solid/open symbols show the Raman transition without/with the $2^{nd}$ stage of cooling using the Raman beams, respectively.

In some embodiments, a method to utilize the interferometer beams to better control the atomic velocity is disclosed. The method comprises adding another stage of cooling just before the coherent state is produced that uses the same beams that produce the coherent state to perform the cooling.

In some embodiments, the velocity of the atoms is nominally perpendicular to the interferometer beams (e.g., as shown in 4B). Due to non-ideal alignment of the launch, the atoms might not be exactly perpendicular to the interferometer beams and may have a component of velocity $v_x$ in the direction of the interferometer beams. This velocity will create a Doppler shift and the Raman transition will be offset by $f_R=2v_x/\lambda$. This Doppler shift can be reduced significantly using the method disclosed herein.

In some embodiments, as the atoms enter the Raman laser beams but are not yet at the center of the beams, a stage of polarization gradient cooling is implemented (e.g., as depicted in region 404 of FIG. 4A). Magnetic fields are typically set to <10 mG. The Raman beams are turned on at low intensity (<1 mW/cm$^2$) and set to the same frequency, significantly detuned from the atomic resonance (e.g., F=2 to F'=3 for Rubidium). The frequency is generally between 15 MHz and 80 MHz less than the resonant frequency. At the same time, a weak repumping beam is applied, e.g. near the F=1 to F'=2 transition for Rubidium. This frequency can be from another laser beam or the same laser beam, if for example, the laser source is modulated to create a frequency sideband. In some embodiments, the laser beam polarizations are opposite, and in this case they are orthogonally linearly polarized.

In some embodiments, sufficient cooling typically requires between 0.1 and 1 ms. The Raman beams must be large enough that the atoms can travel for more than 100 µs before entering the center of the beam. For example, if the atom velocity is 10 m/s then the radius of the Raman beam should be approximately 3 mm or larger.

In some embodiments, to achieve the coldest temperatures in the direction of the interferometer beams, multiple stages may be implemented where the red detuning is sequentially increased either stepwise or continuously. Simultaneously, the intensity can be reduced either stepwise or continuously.

In some embodiments, other cooling mechanisms such as Raman sideband cooling are performed using a first set of interferometer beams.

In some embodiments, after cooling, a stage of state preparation may be implemented as atoms enter a region of laser beam/atom interaction (e.g., region 406 of FIG. 4A). The particular state desired depends on the specific measurement to be made. In this example the F=1, $m_F$=0 state is the target state and is achieved using the interferometer beams arranged to be near resonance with the F=2 to F'=1 levels and the F=1 to F'=0 levels. The beams are polarized are such that they drive σ+ and σ− transitions. The laser beams are pulsed on at these frequencies for a time necessary to put most of the atoms in the desired state. This time might be from 5 to 50 μs if the laser intensity is near the saturation intensity. It is convenient but not required that the Raman beams provide this frequency. If other beams provide these frequencies then they must be sufficiently balanced such that they do not affect the overall atomic velocity.

In some embodiments, after state preparation, the coherent superposition is created at a central region of laser beam/atom interaction (e.g., region 408 of FIG. 4A). One of the Raman beams is set to frequency f1 and the other to f2 (e.g., as shown in 3C). Since there is no Doppler shift after the cooling phase, f2=f1+vHFS+vLS, enabling more precise measurements of vLS and making the Raman transition immune to initial velocity errors. Duration of the Raman pulse is determined by the desired superposition. For a π/2 pulse, the duration is approximately 1 to 10 μs if the intensity is approximately 20 to 2 mW/cm². After the Raman pulse the laser beams are turned off as the atoms leave the region of the Raman beams.

In some embodiments, to create an atom interferometer, the remainder of the sequence commonly comprises two more Raman pulses and a detection event.

In some embodiments, data generated using the system is shown in FIG. 4E. The number of atoms in the F=2 state is shown versus Raman laser frequency in FIG. 4E. The x-axis is a frequency mixed with a source frequency near vHFS to generate beam f2 (e.g., f2 of FIG. 3C). The y-axis is the measured voltage from a transimpedance amplifier connected to a photodiode which collects light from atom fluorescence. In the example shown, a single Raman transition is driven using the two counterpropagating Raman beams. The broad curve shows the transition without the second stage of cooling using the Raman beams. The narrow curve shows the transition with the second stage of cooling. It can be seen that the width is reduced due to the cooling pulse, but also the center has moved. In this case, the polarization gradient cooling was implemented with the Raman beams at the same frequency. This indicates that the initial velocity was not perpendicular to the Raman beams, but was made perpendicular after cooling in the Raman beams.

In some embodiments, the atomic velocities are not perpendicular to the Raman beams and the Raman beams are counterpropagating. In this situation there is an intentional angle θ with respect to perpendicular, which produces a Doppler frequency shift of $f_R$=v sin(θ)/λ, for an atomic speed of v. During the region of cooling (e.g., region 404 of FIG. 4A), Raman beams are applied with a frequency difference $2f_R$ to enforce the Doppler shift and to cool the atoms.

In some embodiments, the atomic velocities are parallel to the Raman beams and the Raman beams are counterpropagating (e.g., as in FIG. 4C and FIG. 4D). This is a configuration often used for precise gravimeters or gradiometers, which require very long interrogation times. It is also common to generate one of the Raman beams by reflection of the first Raman beam from a mirror. In this implementation, the $2^{nd}$ stage of cooling using the Raman beams enforces that the z-component of velocity is defined by the frequency difference between the two Raman beams, and that the velocity will be the same between the separated collections of atoms. The remaining x and y components of the velocity remain unchanged. In this arrangement, the collections of atoms are always in the center of the Raman beams. The second stage of polarization gradient cooling is applied using beams $k_1$ and $-k_1$ shortly after initial collection, cooling and launching using beams B1. Since the nominal velocity is in the direction of the Raman beams, the Doppler shift is quite large and the frequency difference between the beams $k_1$ and $-k_1$ is correspondingly large during the polarization gradient cooling. For 5 m/s velocity this difference is approximately 13 MHz.

In some embodiments, the Raman beams are reflected from a mirror and must share the two frequencies which are separated by 2v/λ. This can be accomplished by applying a strong phase modulation at frequency v/λ. Such a configuration means that there are two preferred cooling frames of reference during the polarization gradient phase; v−=−fλ and v+=+fλ. Since the atoms are launched near the velocity v+ they are outside the capture velocity of the polarization cooling for the v− frame. For slower launches near the capture velocity the v− frame may cause additional heating.

Figure 5A:
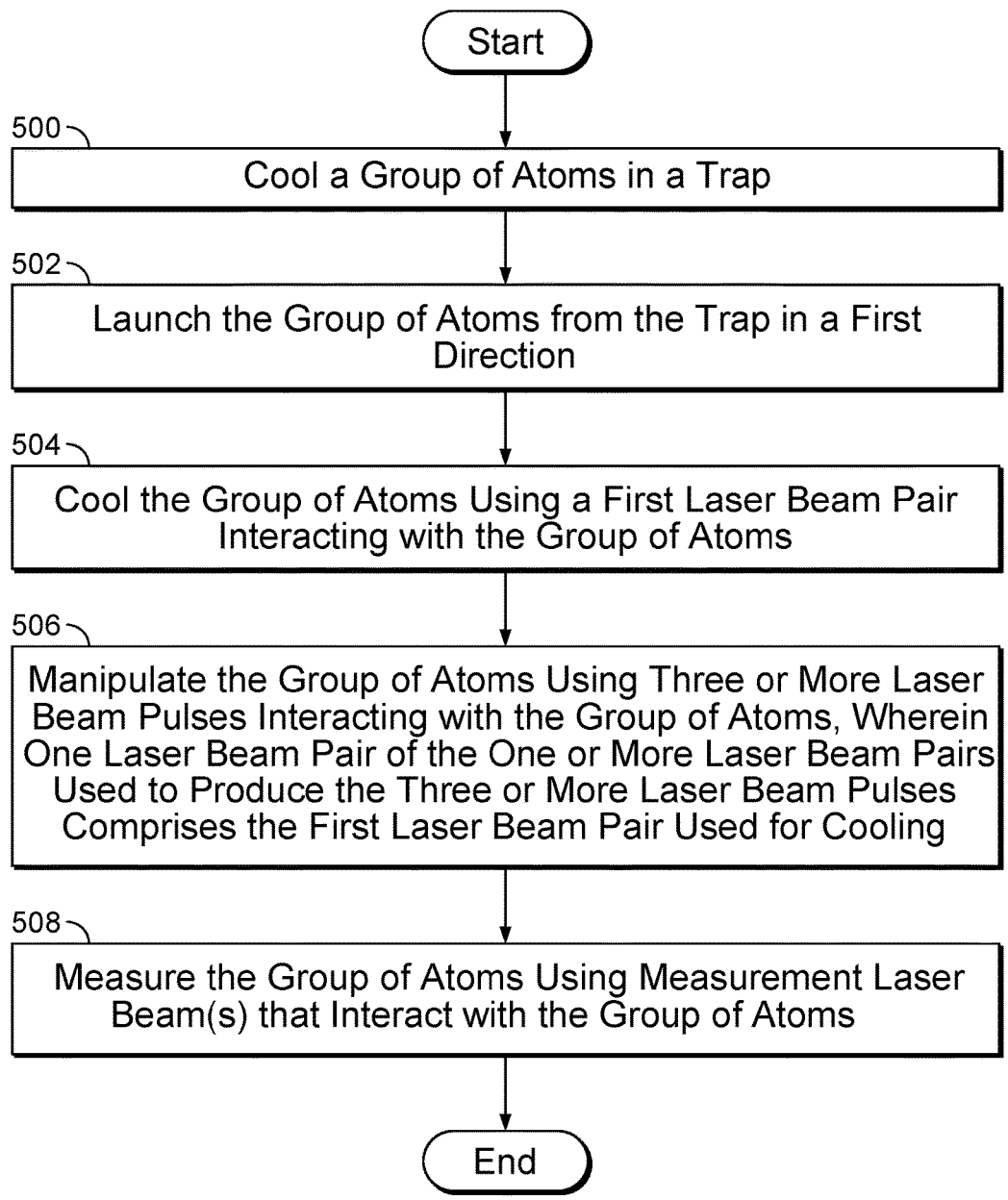
FIG. 5A is a flow diagram illustrating an embodiment of a process for a light pulse interferometer.

FIG. 5A is a flow diagram illustrating an embodiment of a process for a light pulse interferometer. In some embodiments, the process of FIG. 5A is executed by the light pulse interferometer of FIG. 1. In some embodiments, the process of FIG. 5A is controlled by a master controller (e.g., master controller 112 of FIG. 1). In the example shown, in 500, a group of atoms is cooled in a trap. In 502, the group of atoms is launched from the trap in a first direction. In some embodiments, the trap is caused to launch the group of atoms (e.g., by a controller, by a computer program, etc.). In 504, the group of atoms is cooled using a first laser beam pair of one or more interferometer beam pairs interacting with the group of atoms. In some embodiments, the first laser beam pair comprises a polarization for cooling when cooling the group of atoms. In some embodiments, the first laser beam pair comprises a frequency for cooling when cooling the group of atoms. In some embodiments, the state of the group of atoms is subsequently prepared using the first laser beam pair. In some embodiments, the first laser beam pair comprises a polarization for state preparation when preparing the state of the group of atoms. In some embodiments, the first laser beam pair comprises a frequency for state preparation when preparing the state of the group of atoms. In some embodiments, the first laser beam pair of the one or more interferometer beam pairs is caused to cool the group of atoms (e.g., by a controller, by a computer program, etc.) In 506, the group of atoms is manipulated using three or more interferometer laser beam pulses interacting with the group of atoms, wherein one laser beam pair of the one or more interferometer laser beam pairs used to produce the three or more interferometer laser beam pulses comprises the first laser beam pair used for cooling. In some embodiments, the three or more interferometer laser beam pulses are controlled by an electronic control system (e.g., by a controller, by a computer program, etc.). In some embodiments, the one or more interferometer beam pairs are parallel. In some embodiments, only the first laser beam pair is configured to perform cooling. In some embodiments, there are two counter propagating interferometers with intertwined interferometer beams interacting with atom populations. In some embodiments, the one or more interferometer laser beam pairs are all generated by a single laser source. In 508, the group of atoms is measured using measurement laser beam(s) that interact with the group of atoms. For example, a measurement laser is disposed so that a generated laser beam (e.g., comprising one or more generated propagating pulses) interacts with the group of atoms causing a fluorescence that is detected using a detector. In various embodiments, the fluorescence is used to derive a measurement of acceleration, rotation, or any other appropriate quantity.

Figure 5B:
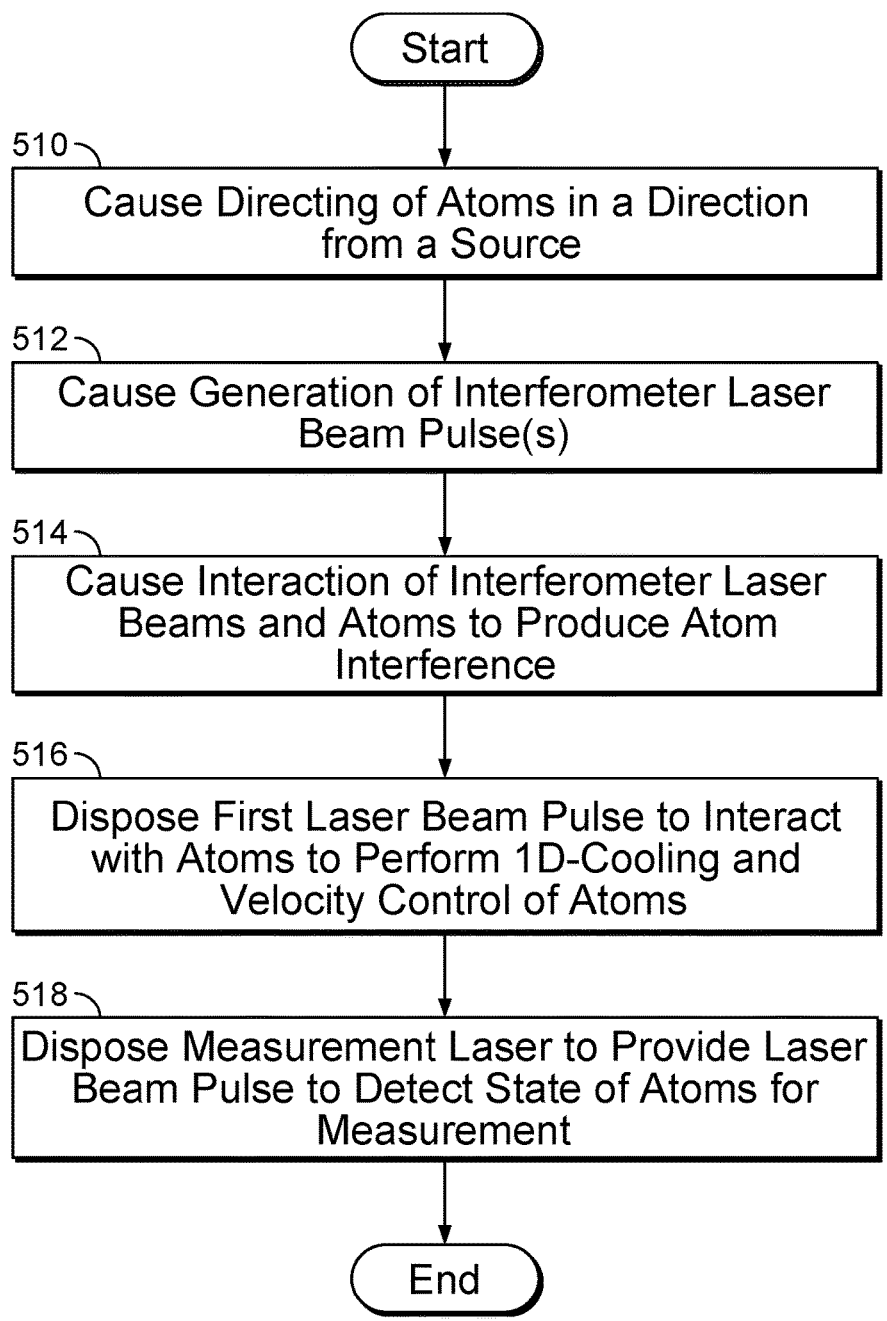
FIG. 5B is a flow diagram illustrating an embodiment of a process for controlling a light pulse interferometer.

FIG. 5B is a flow diagram illustrating an embodiment of a process for an atomic interferometer. In some embodiments, the process of FIG. 5B is executed by the light pulse interferometer of FIG. 1. In some embodiments, the process of FIG. 5B is controlled by a master controller (e.g., master controller 112 of FIG. 1). In the example shown, in 510 launching of atoms from a source is caused in a direction. For example, a group of atoms are launched from an atom source in a direction. In 512, one or more interferometer laser beam pulses are caused to be generated. For example, one or more lasers are used to generate pulsed laser beams for three or more interactions of laser light and the groups of atoms. In 514, interaction of interferometer laser beams and atoms is caused to produce atom interference. For example, the generated laser beam pulses are used to cause atom interference (e.g., similar to FIG. 3A). In 516, a first laser beam pulse is disposed to interact with atoms to perform 1D-cooling and velocity control of atoms. For example, a first laser beam pulse is used to interact with atoms to reduce velocity of atoms in a direction perpendicular to the propagation direction as well as establishing a state for the atoms. In 518, a measurement laser is disposed to provide a laser beam pulse to detect state of atoms for measurement. For example, a measurement laser is caused to generate a laser beam pulse to detect state of atoms for the measurement.

Figure 6:
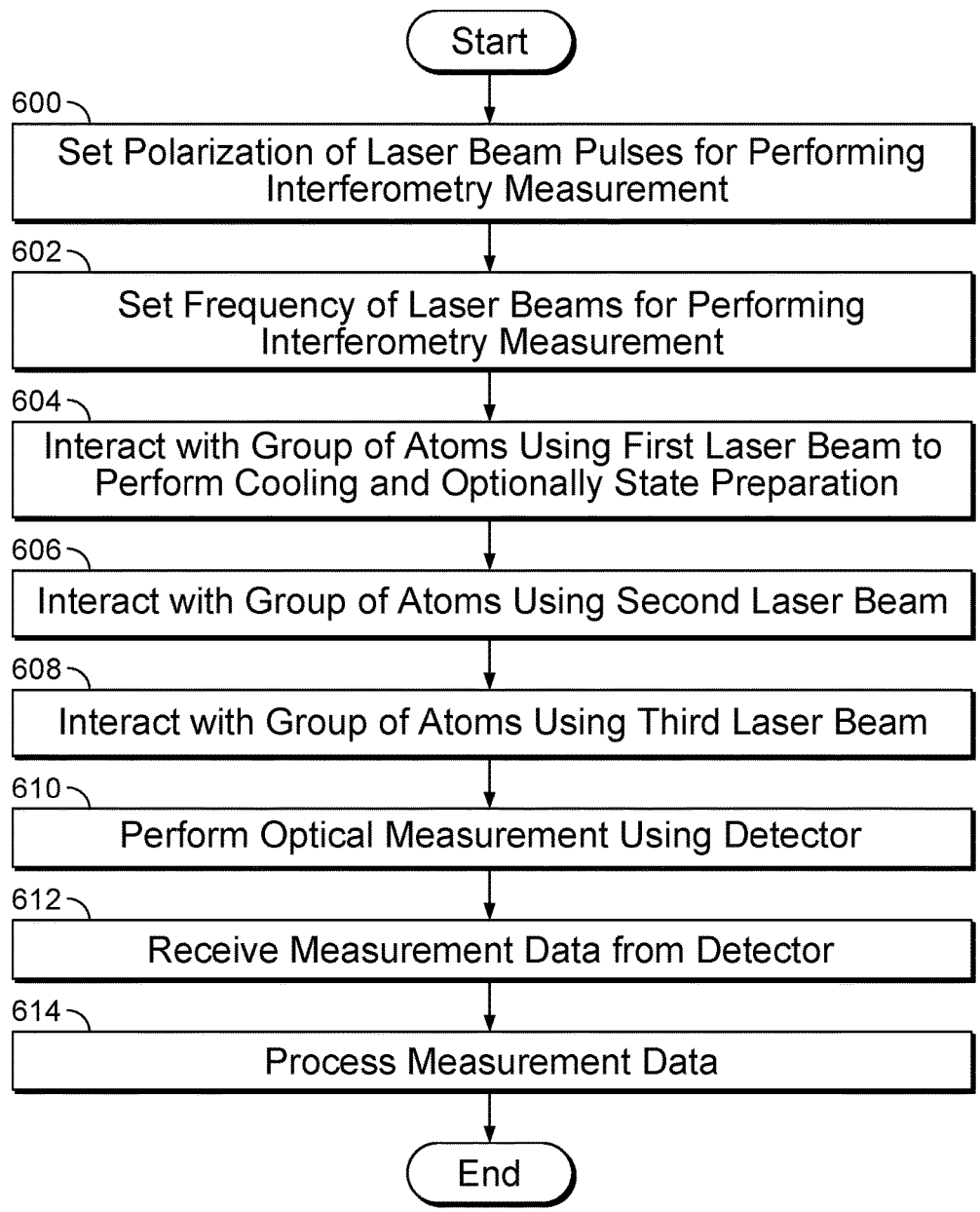
FIG. 6 is a flow diagram illustrating an embodiment of a process for measuring a group of atoms using three or more interferometer laser beam pulses.

FIG. 6 is a flow diagram illustrating an embodiment of a process for measuring a group of atoms using three or more interferometer laser beam pulses. In some embodiments, the process of FIG. 6 implements 506 of FIG. 5A. In the example shown, in 600, the polarization of the laser beam pulses is set for performing an interferometry measurement. For example, the three interferometer laser beam pulses are set to a polarization configuration that enables transitions (e.g. to drive Raman transitions, polarization choices are: linear perpendicular linear, $\sigma^+$-$\sigma^+$, or $\sigma^-$-$\sigma^-$). In 602, the frequency of laser beams is set for performing an interferometry measurement. In 604, the first laser beam interacts with the group of atoms and performs cooling and optionally state preparation. For example, the pulse(s) of a first laser beam are used to cool the group of atoms, and may be used to prepare the atoms in a particular internal state before beginning the interferometer sequence. The first laser beam is also used to interact with the group of atoms and establish a superposition state of the atoms for the interferometer sequence. In 606, the second laser beam interacts with the group of atoms. For example, the pulses of a second laser beam interact with the group of atoms and manipulate the state of the atoms. In 608, the third laser beam interacts with the group of atoms. For example, the pulses of a third laser beam interact with the group of atoms and manipulate the state of the atoms. In various embodiments, multiple pulse schemes for the atom interferometer measurement are possible (e.g., four or more pulses) or any appropriate number of pulses. In 610, an optical measurement is performed using a detector. In some embodiments, the optical measurement comprises an optical measurement of light from a measurement laser beam (e.g., reflected light, scattered light, fluorescence, absorption, etc.). For example, a measurement laser beam interacts with the group of atoms and a detector detects light from the group of atoms during or after the interaction. In 612, measurement data is received from the detector. In 614, the measurement data is processed. In various embodiments, processing the measurement data comprises converting the measurement data to digital data, storing the measurement data, performing computations using the measurement data, or processing the measurement data in any other appropriate way.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A light pulse interferometer, comprising:
a first atom source configured to:
direct a first group of atoms in a first direction to pass through the light pulse interferometer; and
a first laser configured to:
generate one or more interferometer laser beam pairs, wherein the one or more interferometer laser beam pairs interact with the first group of atoms in an interferometer sequence of three or more pulses to produce atom interference within the light pulse interferometer, and wherein a first laser beam pair of the one or more interferometer laser beam pairs is disposed to interact with the first group of atoms to perform 1D-cooling and velocity control of the first group of atoms prior to the interferometer sequence.

2. The light pulse interferometer of claim 1, wherein:
a second atom source configured to:
direct a second group of atoms in a second direction to pass through the light pulse interferometer, wherein the one or more interferometer laser beam pairs interact with the second group of atoms in a second interferometer sequence of three or more pulses to produce atom interference within the light pulse interferometer, and wherein a second laser beam pair of the one or more interferometer laser beam pairs is disposed to interact with the second group of atoms to perform 1D-cooling and velocity control of the second group of atoms prior to the second interferometer sequence.

3. The light pulse interferometer of claim 1, wherein the first atom source is a trap used to pre-cool the first group of atoms.

4. The light pulse interferometer of claim 1, wherein the first laser beam pair performs 1D-cooling of the first group of atoms along an axis of the first laser beam pair.

5. The light pulse interferometer of claim 1, wherein the first laser beam pair has intensity, polarization, and frequency detuning parameters appropriate for Doppler cooling of the first group of atoms.

6. The light pulse interferometer of claim 1, wherein the first laser beam pair has intensity, polarization, and frequency detuning parameters appropriate for polarization gradient cooling of the first group of atoms.

7. The light pulse interferometer of claim 1, wherein the first laser beam pair is further used to prepare an internal state of the first group of atoms.

8. The light pulse interferometer of claim 7, wherein the first laser beam pair comprises one or more polarizations configured to prepare the internal state of the first group of atoms.

9. The light pulse interferometer of claim 7, wherein the first laser beam pair comprises one or more frequencies configured to prepare the internal state of the first group of atoms.

10. The light pulse interferometer of claim 1, wherein a velocity control substantially zeros a mean velocity as projected along the first laser beam pair.

11. The light pulse interferometer of claim 1, wherein a velocity control determines a specified non-zero mean velocity as projected along the first laser beam pair.

12. The light pulse interferometer of claim 1, wherein the one or more interferometer laser beam pairs has a polarization configured to produce atom interference.

13. The light pulse interferometer of claim 1, wherein one of the one or more interferometer beam pairs is used to measure an internal state of the atoms after the interferometer sequence is completed.

14. The light pulse interferometer of claim 1, wherein the one or more interferometer laser beam pairs interacting with the first group of atoms three or more times to produce atom interference comprise interacting using Raman transitions.

15. The light pulse interferometer of claim 1, wherein the one or more interferometer laser beam pairs interacting with the first group of atoms three or more times to produce atom interference comprise interacting using Bragg transitions.

16. The light pulse interferometer of claim 1, wherein the one or more interferometer laser beam pairs propagate parallel to the first direction.

17. The light pulse interferometer of claim 1, wherein the one or more interferometer laser beam pairs propagate perpendicular to the first direction.

18. The light pulse interferometer of claim 1, wherein the first laser beam pair propagates at a predetermined angle with respect to the first direction.

19. The light pulse interferometer of claim 1, wherein each of the one or more interferometer beam pairs propagate parallel to each other.

20. The light pulse interferometer of claim 1, wherein an angle associated with one or more of the one or more interferometer beam pairs is adjusted to compensate for rotational dynamics.

21. A method for a light pulse interferometer, comprising:
  causing directing of a first group of atoms in a first direction from a first atom source to pass through the light pulse interferometer; and
  causing generation of one or more interferometer laser beam pairs using a first laser, wherein the one or more interferometer laser beam pairs interact with the first group of atoms in an interferometer sequence of three or more pulses to produce atom interference within the light pulse interferometer, and wherein a first laser beam pair of the one or more interferometer laser beam pairs is disposed to interact with the first group of atoms to perform 1D-cooling and velocity control of the first group of atoms prior to the interferometer sequence.

22. A computer program product for a light pulse interferometer, the computer program product being embodied in a non-transitory computer readable storage medium and comprising computer instructions for:
  causing directing of a first group of atoms in a first direction from a first atom source to pass through the light pulse interferometer; and
  causing generation of one or more interferometer laser beam pairs using a first laser, wherein the one or more interferometer laser beam pairs interact with the first group of atoms in an interferometer sequence of three or more pulses to produce atom interference within the light pulse interferometer, and wherein a first laser beam pair of the one or more interferometer laser beam pairs is disposed to interact with the first group of atoms to perform 1D-cooling and velocity control of the first group of atoms prior to the interferometer sequence.

* * * * *